United States Patent

[11] 3,589,218

[72] Inventor Siegfried Puck
 Neviges, Germany
[21] Appl. No. 798,925
[22] Filed Feb. 13, 1969
[45] Patented June 29, 1971
[73] Assignee Hugo Karrenberg & Sohn K.-G.
[32] Priority Feb. 13, 1968
[33] Germany
[31] P 16 52 692.4

[54] MEANS TO ACTUATE THE TURNING TOOLS OF ROTATING CUTTER HEADS IN AUTOMATIC LATHES
 1 Claim, 2 Drawing Figs.
[52] U.S. Cl. ............................................. 82/20
[51] Int. Cl. ............................................. B23b 5/12
[50] Field of Search .................................. 82/20

[56] References Cited
 UNITED STATES PATENTS
 2,030,562 2/1936 Barnes et al. .................. 82/20

FOREIGN PATENTS
 330,217 7/1958 Switzerland .................. 82/20

Primary Examiner—Leonidas Vlachos
Attorney—Arthur Schwartz

ABSTRACT: An apparatus for actuating the turning tools of an automatic lathe wherein a plurality of independently adjustable, angularly spaced cutting tool holders with associated tools are arranged on a rotatable cutting head disposed on one end of a spindle. Each tool holder has an associated lever which cooperates with an axially moveable pressure key having an inclined surface. Movement of the key actuates each the lever to swing the associated tool holder inwardly whereby each tool may engage a workpiece. Each one of a plurality of axially moveable slide arms transfer force through an associated slide bearing and to push rod. Each push rod engages a pressure key to move the pressure key axially.

PATENTED JUN29 1971

3,589,218

INVENTOR
SIEGFRIED PUCK
BY
ARTHUR SCHWARTZ
ATTORNEY

MEANS TO ACTUATE THE TURNING TOOLS OF ROTATING CUTTER HEADS IN AUTOMATIC LATHES

The present invention relates to a means to actuate the turning tools of cutter heads rotating around the work axis in automatic lathes, in which the tool holders are provided on shafts supported in the cutter head, the rotation of which is effected by means of a key element adapted to be displaced in the direction of the work axis and acting upon the end of an arm located on each shaft, the key surface not facing the turning tools ascending.

In spindle heads of automatic lathes it is already known to secure the turning tools in rocker type tool holders for independent movement of at least two turning tools at the cutter head during operation of the machine, said tool holders being moved by tilting levers. The tilting levers are moved by sloping nose keys. At the end opposite their sloping surface said nose keys are connected by means of sliding rings which are displaced by means of levers via pivot bearing and bearing bush.

In rotating cutter heads of lathes it is furthermore known to support the turning tools in rocker type tool holders obtaining their movement through a taper bush adapted to be displaced on the spindle, said taper bush acting upon a tool holding shaft by means of its taper surface via a pulley and a corresponding pulley lever rigidly connected to said shaft and thus supplying the cutter holders with a swinging movement. This system only allows for simultaneous swinging in of the tool holders during processing. Individual control of the tool holders is not possible.

The main object of the present invention is to hide the actuating elements for three turning tools in a spindle with a cutter head of comparatively small dimensions and permitting relatively high numbers of revolutions, the cutter holders being rigidly supported and the actuating elements being removed from the cutting region, while they are working independently of each other during processing.

According to the present invention this problem has been solved by providing a pressure key adapted to be displaced in the rotating cutter head spindle in the direction of its axis, for each turning tool of three turning tools arranged for independent functioning and individual operation, the key surface ascending towards the side not facing the turning tools and acting upon the arm of the shaft supporting the tool holder, while the shafts together with the arms are within the cutter head except for the projection supporting the tool holders.

Due to this arrangement it is achieved that the tool holders which may be controlled independently during processing, are provided with a very rigid and solid support and that the actuating element is not within the cutting region, since actuation of the turning tools has been located in the spindle head. At the same time dimensions of the spindle head are comparatively small permitting however to house the actuating elements for three tool holders to be controlled independently.

With the object of the present invention arrangement is favorably such that an extension of each pressure key in the form of a rod, on the side not facing the cutter head, is connected via transverse springs with the interior ring of a sliding ring on the spindle comprising an interior ring and an exterior ring which contains said interior ring so that the latter may be turned in said exterior ring, while any force of displacement acts upon said sliding ring.

The exterior rings of the sliding rings may be provided on arms extending towards the spindle axis or projecting from slides which, in the not moving spindle head, are offset at an angle and which may be displaced in the direction of the spindle axis.

The accompanying drawing shows an example of an embodiment according to the present invention.

Figure 1:
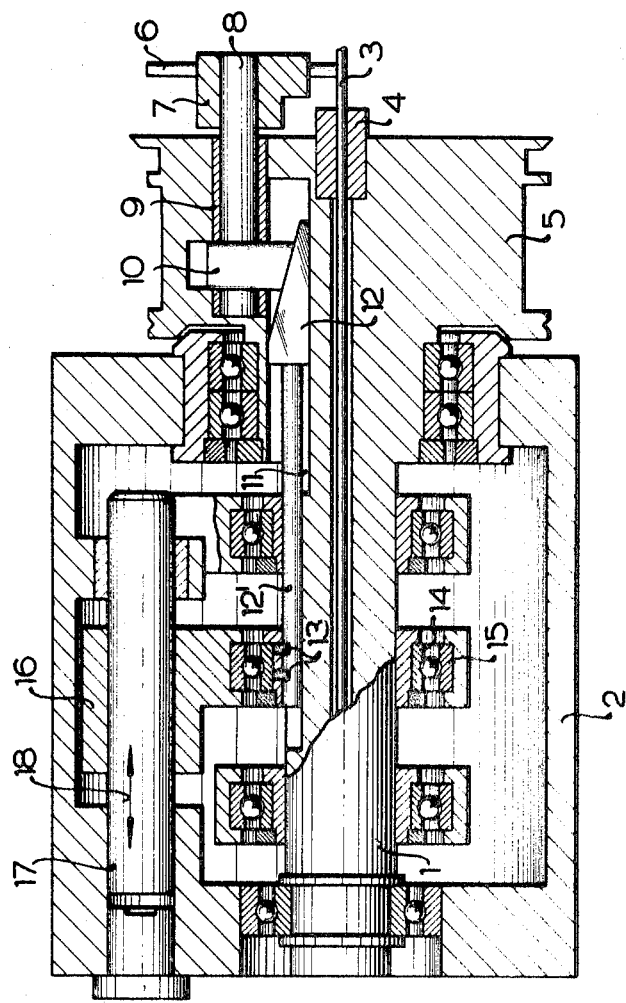
FIG. 1 is a longitudinal section of a spindle together with a cutter head.
Figure 2:
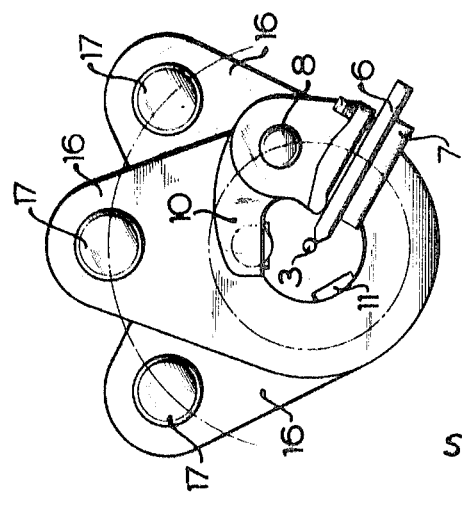
FIG. 2 is a front view.

The spindle 1 is supported in the spindle head 2 and is adapted to rotate with respect to the latter. The spindle 1 rotates around a wire 3 provided in its axis which is standing or moving in the longitudinal direction depending upon whether recessing or longitudinal turning is employed. The bush 4 is secured in the cutter head 5. The cutter head 5 forms the front part of the spindle 1. Around the bush 4 there are arranged the turning tools 6 which are held by the tool holders 7. In the drawing only a single tool holder out of three tool holders 7 each having a turning tool 6 has been shown. The tool holders are provided on the tool shafts 8 and connected to the same by a driving engagement.

The tool holder shafts are supported in the cutter head 5. Their projecting ends are bearing the tool holders. Between the bearing bushes 9 for the tool holder shaft a lever 10 projecting towards the spindle has been provided on the tool holder shaft 8 in a rigid connection to the same, that is to say, following upon rotation of said shaft.

The spindle 1 has longitudinal grooves, that is to say, grooves 11 extending in the axial direction. In said grooves there are the pressure keys 12 adapted to be displaced in the axial direction, their key surfaces facing the lever 10 and ascending towards the side not facing the tool holder. The key face is intended to contact the projecting end of the lever 10, as may be seen from FIG. 1. When the pressure key 12 is displaced, it swings the lever 10 which turns the shaft and consequently swings the tool holder against the work.

The pressure keys are provided with an extension 12' in the form of a rod. The extension is connected to the interior ring 14 of a sliding ring via springs or transverse keys 13 respectively. The interior ring 14 is placed in an exterior ring 15 in which the interior ring 14 may be turned via the ball.

The exterior ring is placed in the end of the slide arm 16 projecting towards the spindle, which arm is provided at the slide 17 and taken along by the same when displaced in the axial direction. The slide 17 is located in the not moving spindle head 2. When the slide 17 is displaced, the sliding ring is moved which again moves the pressure key 12. Movement of the pressure key results in a movement of the turning tool holder via the lever 10 and the tool holder shaft 8 and consequently in a movement of the turning tool. The direction of displacement of the slide is indicated by the double arrow 18.

What I claim is:

1. An apparatus for actuating the turning tools of an automatic lathe comprising:
   a. A stationary spindle head;
   b. A hollow spindle rotatably supported in said spindle head;
   c. A cutter head formed on one end of said spindle, said cutter head being disposed outside said spindle head;
   d. A plurality of rotatable tool shafts disposed in said cutter head in angularly spaced apart relationship;
   e. A plurality of tool holders, each of said tool holders being mounted on one of said rotatable tool shafts to rotate therewith;
   f. A plurality of pressure keys in said cutter head, said pressure keys having an inclined surface ascending in a direction away from said tool holders, said pressure keys being axially moveable;
   g. A plurality of levers in said cutter head, one end of each of said levers being connected with one of said tool shafts, the other end of each of said levers cooperating with said sloping surface of each of said pressure keys to effect movement of each of said levers and rotation of each of said tool shafts;
   h. A plurality of peripherally open, axial guide grooves in said spindle, each of said guide grooves being spaced the same radial distance from the axis of said spindle;
   i. A plurality of independently moveable push rods, each push rod being slidably disposed in one of said guide grooves, one end of each of said push rods engaging one of said pressure keys;
   j. A plurality of slide arms disposed in said spindle head for cooperation with said push rods, each of said slide arms extending radially outwardly from said push rods, said slide arms being angularly spaced from each other, and disposed at substantially identical radial distances from the axis of said spindle, said slide arms also being axially offset from each other and being adapted for movement parallel to said push rods;

k. A plurality of sliding bearings being disposed between said first ends of said push rods and said slide arms, each of said sliding bearings having an interior ring and an exterior ring, said exterior ring of each of said slide bearings being secured to one of said slide arms, said interior ring of each of said sliding bearings being disposed about said spindle and being axially displaceable therealong, said interior ring of each of said sliding bearings also being secured to one of said push rods so that each of said sliding bearings will transfer motive force from one of said slide arms to one of said push rods.